Oct. 23, 1956 E. TIGER 2,768,244

TAPE RECORDING DEVICE

Filed Aug. 26, 1955 7 Sheets-Sheet 1

Inventor
Emil Tiger
By Silverman + Mullin
Attorneys

Oct. 23, 1956 E. TIGER 2,768,244

TAPE RECORDING DEVICE

Filed Aug. 26, 1955 7 Sheets-Sheet 2

Inventor
Emil Tiger
By Silverman + Mullin
attorneys

Oct. 23, 1956 E. TIGER 2,768,244

TAPE RECORDING DEVICE

Filed Aug. 26, 1955 7 Sheets-Sheet 3

Inventor
Emil Tiger
By Silverman + Mullin
Attorneys

Oct. 23, 1956 E. TIGER 2,768,244

TAPE RECORDING DEVICE

Filed Aug. 26, 1955 7 Sheets-Sheet 4

Inventor
Emil Tiger
By Silverman + Mullin
Attorneys

Oct. 23, 1956 E. TIGER 2,768,244

TAPE RECORDING DEVICE

Filed Aug. 26, 1955 7 Sheets-Sheet 5

Inventor
Emil Tiger
By Silverman + Mullin
attorneys

Oct. 23, 1956 E. TIGER 2,768,244

TAPE RECORDING DEVICE

Filed Aug. 26, 1955 7 Sheets-Sheet 6

Inventor
Emil Tiger
By Silverman & Mullin
Attorneys

Oct. 23, 1956 E. TIGER 2,768,244

TAPE RECORDING DEVICE

Filed Aug. 26, 1955 7 Sheets-Sheet 7

Inventor
Emil Tiger
By Silverman + Mullin
Attorneys

United States Patent Office 2,768,244

Patented Oct. 23, 1956

2,768,244

TAPE RECORDING DEVICE

Emil Tiger, Skokie, Ill., assignor to Sound, Inc., Chicago, Ill., a corporation of Illinois Application August 26, 1955, Serial No. 530,690

23 Claims. (Cl. 179—100.2)

This invention relates generally to tape recording devices and more particularly is concerned with a mechanism for controlling the various speeds at which a tape or wire recording device will operate by means of a single control level.

Prior tape recording devices which have utilized two speeds for recording and playing back the recorded tape have been complex in the mechanism and apparatus required in order to accomplish the four basic functions, namely—record at low speed, play back at low speed, record at high speed, and play back at high speed. A plurality of control levers, dials, switches and the like have been required. Furthermore, in prior equipments, the additional functions of rewind both forward and reverse have complicated the mechanism and controls.

The most disadvantageous results of prior tape recording devices have been as follows: It has required considerable skill to operate the same such that in order to adjust the device from function to function, time has been lost and errors committed which might result in inadvertent erasure, malfunction and the like. The devices have easily become maladjusted and required repair. The devices have been expensive to manufacture and hence high priced. The size of the devices and the number of parts have been great.

This invention has for its primary object the elimination of the disadvantages of prior devices in the provision of a novel mechanism for tape recording devices which is simple to operate; which is foolproof such that even a child can operate the same without error and without damaging the mechanism with only a minimum of instructions; which has an easily understood visible lever the movement of which to clearly marked positions results in the accomplishment of any one of at least six different functions; which is made out of a small number of easily fabricated and easily assembled parts enabling the same to be produced readily by modern mass production assembly line methods resulting in an extremely low priced device accomplishing functions heretofore limited to expensive tape recording equipment; which is small in size and easily portable by reason of the simplicity of the mechanism.

Further objects of the invention are concerned with the structure of the mechanism so that the various functions are accomplished.

In order to render the explanation lucid and fully understood, a preferred embodiment of the invention has been fully illustrated and described in the following specification. This is in accordance with the patent laws and sets forth what is considered the best mode of constructing and apparatus in accordance with the invention. Many advantages and attributes of the invention not mentioned in connection with the above objects will immediately occur to the artisan skilled in the art as the description proceeds, but it is desired to emphasize that the very nature of the invention admits of considerable variation in the form and proportion of the parts and the mechanical connections therebetween and hence it is emphasized that the description is not intended by way of limitation but only as example.

In the drawings in which like characters are used to represent the same or similar parts throughout the several figures of the drawings.

Without considering the details of the mechanism which accomplishes the various functions, of which six will be described, attention is first invited to the top plan view of the tape recording device which of course can be varied as to ornamental configuration and form. The controls of the apparatus and the functions performed will be outlined, as will also be the requirements, that is, what must be electrically and mechanically executed for the various positions of the control lever. And even before doing this, it would be well to give a general description of the external parts of the apparatus.

*General external description of the device*

Figure 1:
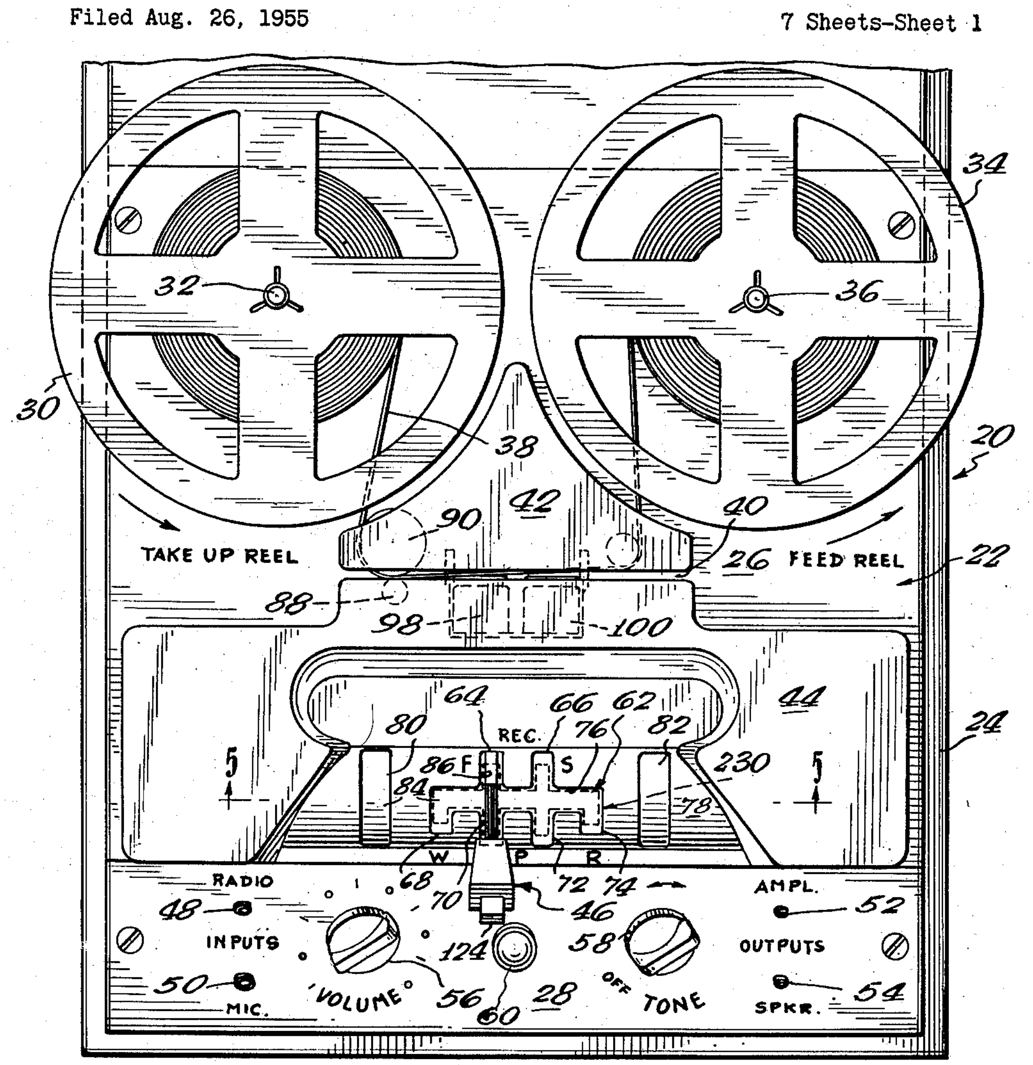
Fig. 1 is a top plan view of a tape recording device constructed in accordance with the invention.

The tape recording device is designated generally by the reference character 20 and as will be seen in Fig. 1, the entire device is secured to or supported from a chassis designated 22 preferably formed of sheet metal, set into a suitable cabinet 24 of wood or the like. Visible in Fig. 1 is the top panel 26 of the chassis which has a front downwardly slanted part 28 serving as the support for various knobs and electrical connectors as will be explained.

At the outset it is desired to state that the electrical circuit of the tape recording device is not intended to be considered a portion of the invention, except insofar as the operation of the single control lever serves to connect the inputs and outputs of the electronic amplifier to the various portions of the circuit. The precise connections and switching means will not be explained since the functions achieved through the mechanical movement of the control lever are easily converted to the electrical switching desired to accomplish the several purposes. The major portion of the electronic components are contained in the portion of the device beneath the slanted panel portion 28.

The visible parts at the top of the device 20 consist of the take-up reel 30 on the left hand side, mounted for rotation upon the left hand spindle 32; the feed reel 34 on the right hand side, mounted for rotation on the right hand spindle 36; the tape 38 which has portions shown wound about each of the reels and threaded through a slot 40 formed between the rear cover plate 42 and the front cover plate 44; the control lever 46 which extends through slots in the front cover plate 44; and the electrical components mounted on the slanted panel portion 28.

There are provided two input jacks 48 and 50 for feeding signals from some translation devices into the amplifier of the device. These could be of different matching impedance, such as for example the outputs of a radio or microphone. There are two output jacks, 52 and 54 for driving another amplifier, or a speaker in addition to that self-contained (not shown). The slanted panel portion 28 also mounts a volume control knob 56 and a combined tone control and on-off switch knob 58, with an input signal level indicator such as a neon tube 60 disposed therebetween.

The control lever 46, as explained above, extends through an opening 62 in the front cover plate 44 which may be described as irregularly shaped and provided with six control slots 64, 66, 68, 70, 72 and 74 branched forward and rearward as will be described, from an elongate main slot 76 which extends transverse relative the control slots. The slots are all arcuate in a vertical plane from front to rear and the front cover plate has an arcuate section 78 integral therewith in which the opening 62 is formed, and two large slots 80 and 82 at the ends thereof. In causing the recording device 20 to perform the various functions which will be described the control lever 46 is shifted along the main slot 76 to the various control slots which branch off therefrom, and is moved into the chosen control slot. Obviously this movement is exclusive so that the function chosen is the only function performed.

There is an elongate arcuate protective member 84 disposed beneath the arcuate section 78 which is visible from the top of the device 20 only through the slots. The shank of the control lever 46 passes through a slot 86 formed therein so that movement of the lever 46 transverse of the arcuate portion 78 will not cause movement of the arcuate member 84, but movement along the length of the slot 76 will cause corresponding movement right or left of the said arcuate member 78.

The cover plates 42 and 44 are held by any suitable spring clips to enable ready removal thereof. The front cover plate 44 will seldom need to be removed, but the rear plate may sometimes require such removal for adjustment of the heads or driving mechanism. Also the threading of the tape may often need adjustment. It will be noted in Fig. 2 that there are shown beneath the rear cover plate 42 the drive roller 88, the pressure roller 90 of some resilient material such as rubber rotating on a shaft 92 which is movable in a slot 94 so that the tape 38 may be frictionally clamped to the drive roller 88 when desired. An idler roller 96 is mounted on the right hand side, the tape taking a turn around a part of the circumference thereof, and passing between the heads 98 and 100 and their respective pressure pads 102 and

104 respectively. The pressure pads are mounted on a carrier strip 106 secured to a vertical rod 108 which is movable in slot 110 to enable pressure to be applied or not as desired.

*Functions and requirements of controls*

Without delving into the mechanism by which the actual desired functions are accomplished, it will be enlightening at this time to explain what is desired from the various positions of the control lever 46. There is no need to describe what the knobs and jacks are used for, since this is obvious.

Figure 4:
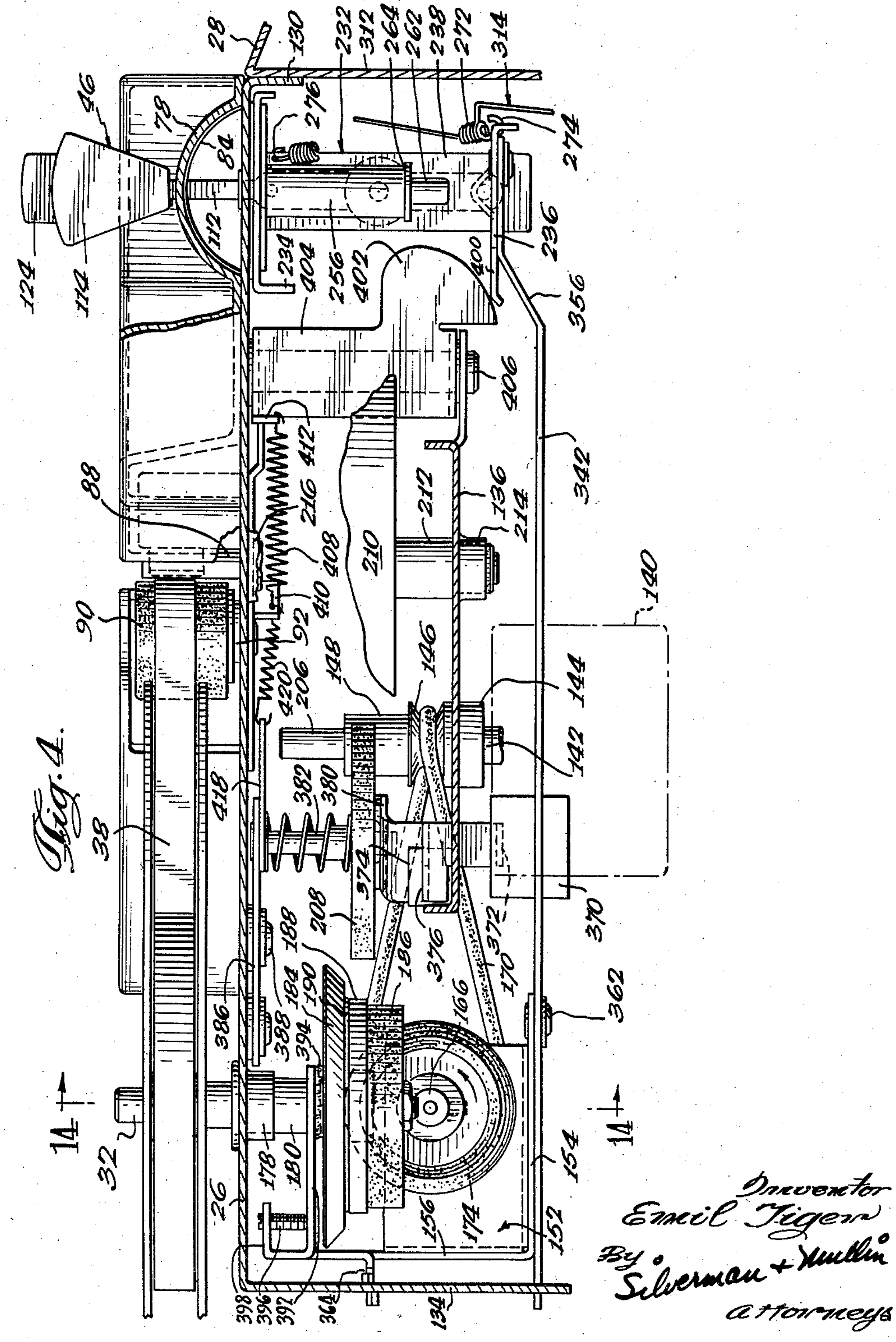
Fig. 4 is a sectional view taken through the tape recording device along a line from front to rear with the device erect, portions being shown in section, portions being in elevation, and certain parts broken away to show the mechanism. The control lever is in neutral or stop position.
Figures 10, 11, 12:
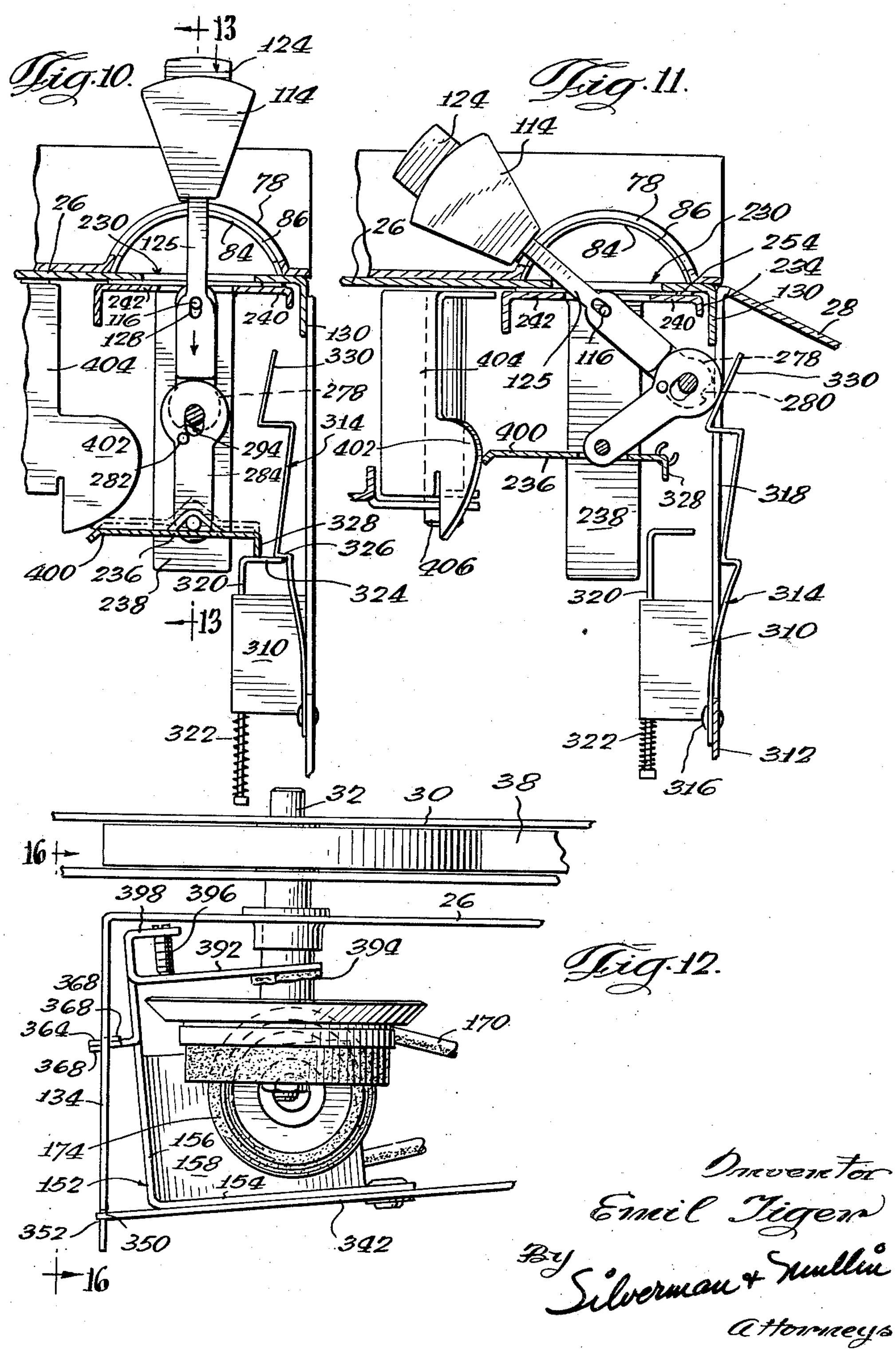
Fig. 10 is a sectional view similar to that of Fig. 6, but illustrating the control lever in neutral or stop position.
Fig. 11 is a view similar to that of Fig. 10, but the control lever having been moved to one of the record positions.
Fig. 12 is a fragmentary view similar to the left hand portion of Fig. 4 but showing the mechanism in either play back or record position.

Considering first the control lever 46 and the irregular opening 62, it is a logical start to place the lever in such a position that nothing occurs. This may be considered stop or neutral. This is illustrated in Figs. 4 and 10, and it is any position in which the lever is vertically disposed anywhere along the length of the main slot 76. Shifting the lever along the slot to the entrances of the various control slots sets up the mechanism so that the desired functions will be executed when the lever is moved into the particular slot, but so long as the lever is in the main slot 76, nothing occurs. The energization of the device 20 through the operation of the switch 58 starts the motor (to be described) which keeps rotating irrespective of the position of the lever 46, but not necessarily driving any part of the mechanism.

Figures 5, 6, 13:
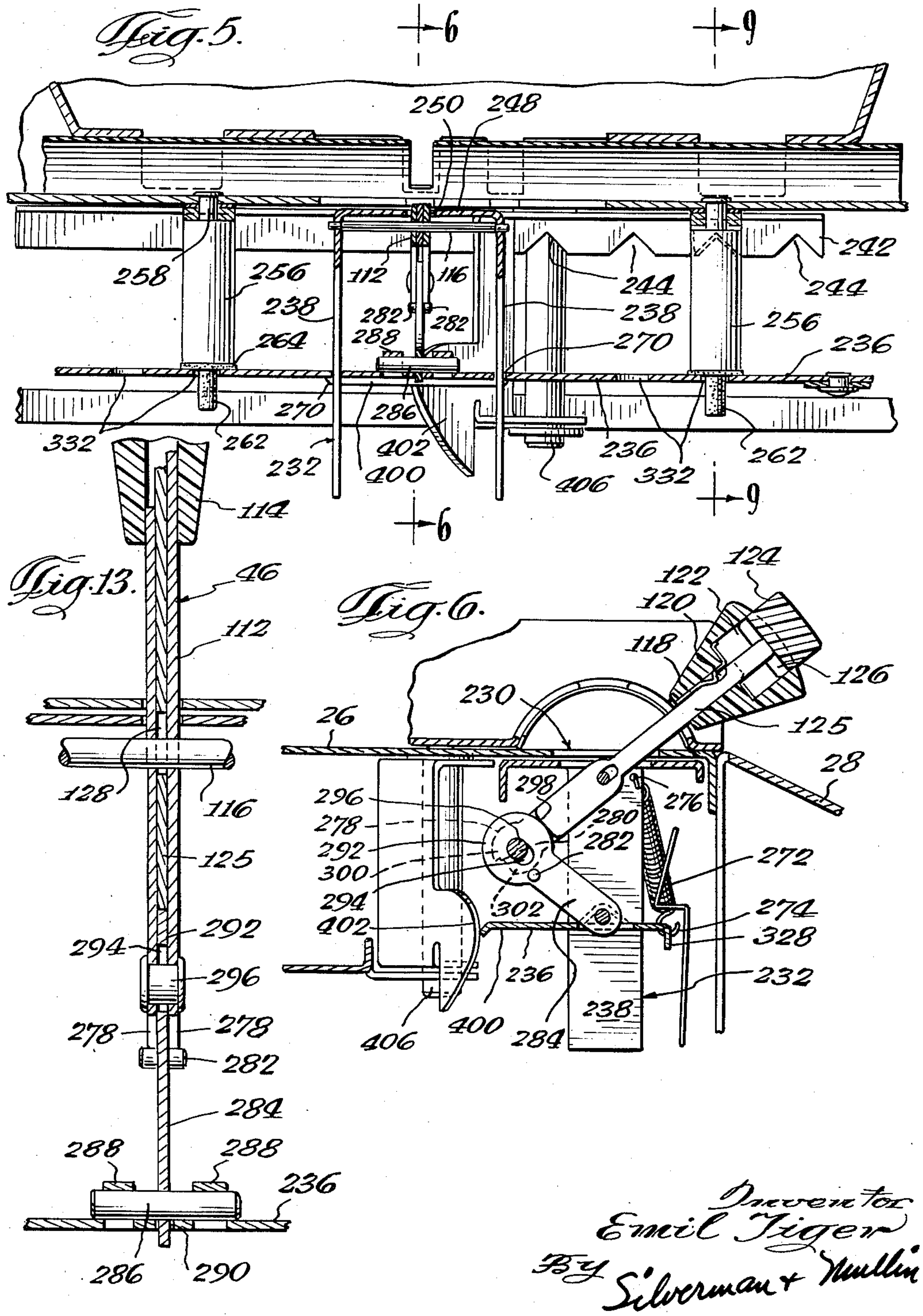
Fig. 5 is a fragmentary sectional view taken through the control mechanism along the line 5—5 of Fig. 1 and in the direction indicated.
Fig. 6 is a detailed sectional view along the line 6—6 of Fig. 5 and in the direction indicated, the control level being in fast play position.
Fig. 13 is a sectional view through the control lever along the line 13—13 of Fig. 10 and in the indicated direction.

The control lever has several parts which it is best that one understand for the purposes of this section of the specification, and for that reference may be had to Figs. 6 and 13. The lever shank 112 is bifurcate with the knob 114 secured at the top of the shank 112 and the shank pivotally mounted on a short shaft 116 carried by an H-shaped carriage which will be described in a following section, and which shifts along the length of the movement of the lever 46 in the main slot 76. There is a spring clip 118 engaging in a notch 120 in the end of the shank 112 to prevent relative movement between knob 114 and shank 112. The end of the knob 114 is hollow at 122 and a button 124 is reciprocable in the hollow 122. A central push rod 125 is mounted between the bifurcations of the shank 112 for longitudinal movement relative thereto, and the upper end of the push rod 125 is secured to the button in a suitable slot 126. A slot 128 in the push rod at the shaft 116 enables this movement.

Thus we see that there is a button 124 in the top of the control lever 46 which can be pressed for functional purposes.

The device 20 is intended to be used at two speeds, high and low. The low speed is for the recording and play back of sound which is not required to be of high fidelity, such as dictation or speech, while the opposite is true of the high speed. Thus, it is necessary that the device be capable of recording at low and high speeds and playing back at both speeds, requiring two different spindle speeds. There being two spindles, it is desirable that the tape be capable of quick winding on either of the two spindles, and in opposite directions.

Figure 2:
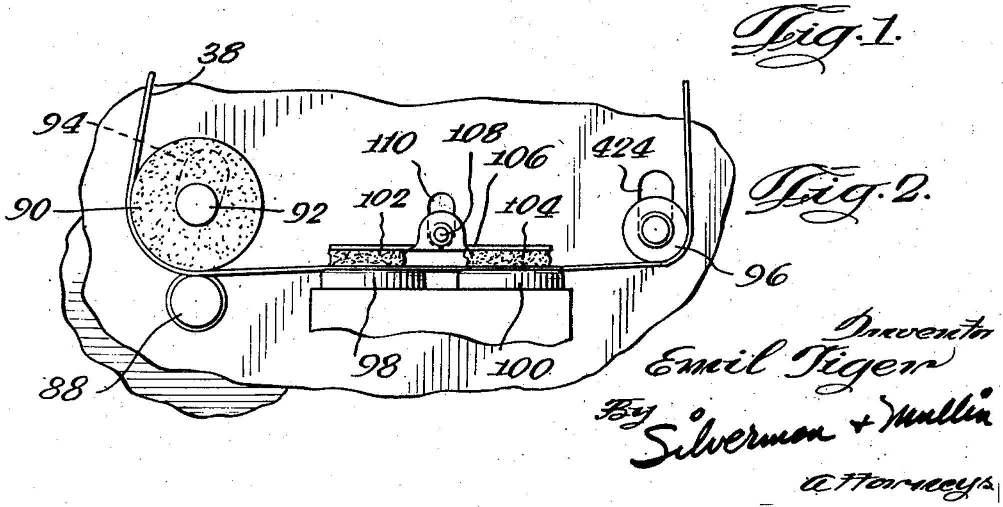
Fig. 2 is a fragmentary top plan view of the device mechanism from the top of the device, one of the cover plates having been removed.

Considering the various functions to perform, these may be tabulated as follows:

*Slow speed record.*—The tape 38 is required to be wound upon the take up reel 30 in a counterclockwise direction but must be moving past the heads at a constant speed, from right to left as viewed in Fig. 2. The drive roller 88 must therefore be connected to the motor to rotate counterclockwise at the desired speed. The speed of the spindle 32 will be variable because of the change in diameter of the taken up take. The pressure pads 102 and 104 are required to be pressed against the heads to hold the tape thereagainst. The head 98 must be electrically connected with the output of the amplifier of the tape recorder and properly biased to magnetize the particles on the tape as they speed past. The head 100 must simultaneously be properly biased with direct current to erase anything from the tape prior to recording. With the motor rotating, the button 124 is depressed and the lever 46 moved rearward into control slot 66. This slot may be marked with some indicia, such as S, designating slot and the other slots marked accordingly. For example, in Fig. 1 the two slots 64 and 66 are marked REC which signifies record, and each slot is marked F or S for fast or slow.

*Slow speed play back*

It is presumed that the tape 38 has had some form of intelligence recorded thereon, is wound upon the feed reel 34, is properly threaded and is ready to be played back. It is now necessary to energize the drive roller 88 at the proper speed and hence the constantly rotating motor must be mechanically linked therewith. The pressure roller 92 must be moved into engagement with the drive roller 88 having the tape 38 engaged therebetween, and the left hand spindle 32 must be rotated in order to take up the tape 38 as it comes between the drive roller 88 and pressure roller 90 at a speed sufficient to prevent slack. The spindle 32 must therefore be connected with the motor to be driven in a counterclockwise direction. Since it is desired that there be no erasing the head 100 must be de-energized and the head 98 connected to the input of the amplifier. Obviously the carrier 106 must press the pressure pads 102 and 104 into engagement with the tape 38 on the back thereof.

All of the above is accomplished by moving the control lever 46 forward of the device 20 into the control slot 72. There is no need to press the button 124 since the electrical switching accomplished by pressing the button and moving the lever is not required during play back.

*Fast speed record and play back*

The requirements of fast speed record and fast speed play back are identical with those accomplished at slow speed with the exception of course that the speed of the drive roller 88 must be increased by connecting a different linkage between the motor and the drive roller. For fast speed record the button 124 is required to be pressed and the lever 46 is moved rearward of the tape recording device 20 into the control slot 64. For fast speed play back the lever 46 is moved into the control slot 70, this latter position being illustrated in Fig. 1.

*Neutral position*

It will be obvious that when the machine is in neutral position which also comprises a stop position, all of the rotating mechanism effecting movement of the tape must be halted. Consequently, when the lever 46 is positioned anywhere along the main slot 76 both spindles 32 and 36 must have been braked, since the lever 46 has probably been thrown into neutral position following its having been in one of the control slots with the spindles 32 and 36 rotating. Likewise, the carrier 106 must be moved away from the heads 98 and 100 to enable easy threading of the tape 38 past the heads. The electrical conditions governing operation of the heads should also be such that there will be neither erasure nor recording while adjusting and threading the tape. A requirement of the mechanical linkages operated by the control lever 46 is that they maintain the above described conditions while being moved to any position along the slot 76.

*Wind and rewind*

These two functions are performed by moving the lever into either of the slots 68 or 74 respectively. When the lever is moved into the left hand slot the left hand spindle 32 rotates in counterclockwise direction thereby causing the reel 30 to take up on the tape 38 at a high speed. When, on the other hand, the lever 46 is moved into the right hand control slot 74, the right hand spindle 36 rotates at a high speed in a counterclockwise direction causing the feed reel 34 to take up on the tape 38. Obviously, whichever spindle rotates the other must be idling to permit take up of the tape. The carrier 106 must be away from the heads 98 and 100 and the drive roller 88 and its pressure roller must be separated. The electrical conditions are the same as those described in connection with the neutral position. No pressure is required on the button 124 during wind and rewind.

*Description of driving mechanism*

The top plate 26 is formed of a member of sheet metal that has integral bent flanged edges, the front flange being designated 130 and being relatively short, the side flanges being designated 132 and 133 and also being short, but the rear flange 134 extending downward a substantial amount in order to provide guide slots which will be discussed below. A sub-chassis member 136 consisting of a plate spaced below the top plate 26 is provided with integrally flanged ends 138 extending upward to meet and be secured to the flanges 132 and 133. Upon the lower face of the sub-chassis member there is secured a conventional constant speed motor, for example, the shaded pole variety. The construction and mounting of the motor is conventional and hence is not detailed except as indicated at 140 in broken lines in Figs. 3 and 4.

The motor shaft 142 (Fig. 4) has a pulley member 144 secured thereto providing a sheave portion 146 and a friction drive surface 148. The motor 140 is connected to the electrical circuit in such a manner that it is continuously energized when power is on, and hence rotates constantly. The mounting is such that the motor shaft 142 rotates in a clockwise direction as viewed in Fig. 3. This drives the pulley member 144 in a clockwise direction also. The sub-chassis member 136 is slotted at 150 to clear the pulley member, which extends from below the sub-chassis member to above the same.

A shiftable carriage 152 at the rear of the device 20, below the plate 26, consists of an elongate transverse carrier plate 154 having an integrally bent upstanding rear wall 156 and two intermediate support brackets 158 and 160 (Fig. 3) which are arranged vertically. The carriage 152 is preferably formed of sheet metal welded together. Shifting of the carriage is accomplished by mechanism operated by the control lever 46 when shifted along the principal slot 76, but the details of this will be set forth in another section of this specification.

Each of the brackets 158 and 160 has a journal 162 and 164 respectively within which a shaft 166 is rotatably arranged. On one side of the bracket 160 a pulley 168 is mounted secured to the shaft and having a flexible belt 170 engaging the same at one end of the loop and engaging the sheave portion 146 at the opposite end of the loop. Rotation of the shaft 142 on a vertical axis is thus transformed into rotation of the shaft 166 on a horizontal axis. As viewed in Fig. 4, this rotation of shaft 166 is counterclockwise. On the opposite side of the bracket 160 a bevel friction pinion 172 is mounted close to the bracket, so that the shaft 166 is prevented from shifting axially by the pulley 168 and pinion 172. The pinion body is formed of rubber or similar material.

Figure 3:
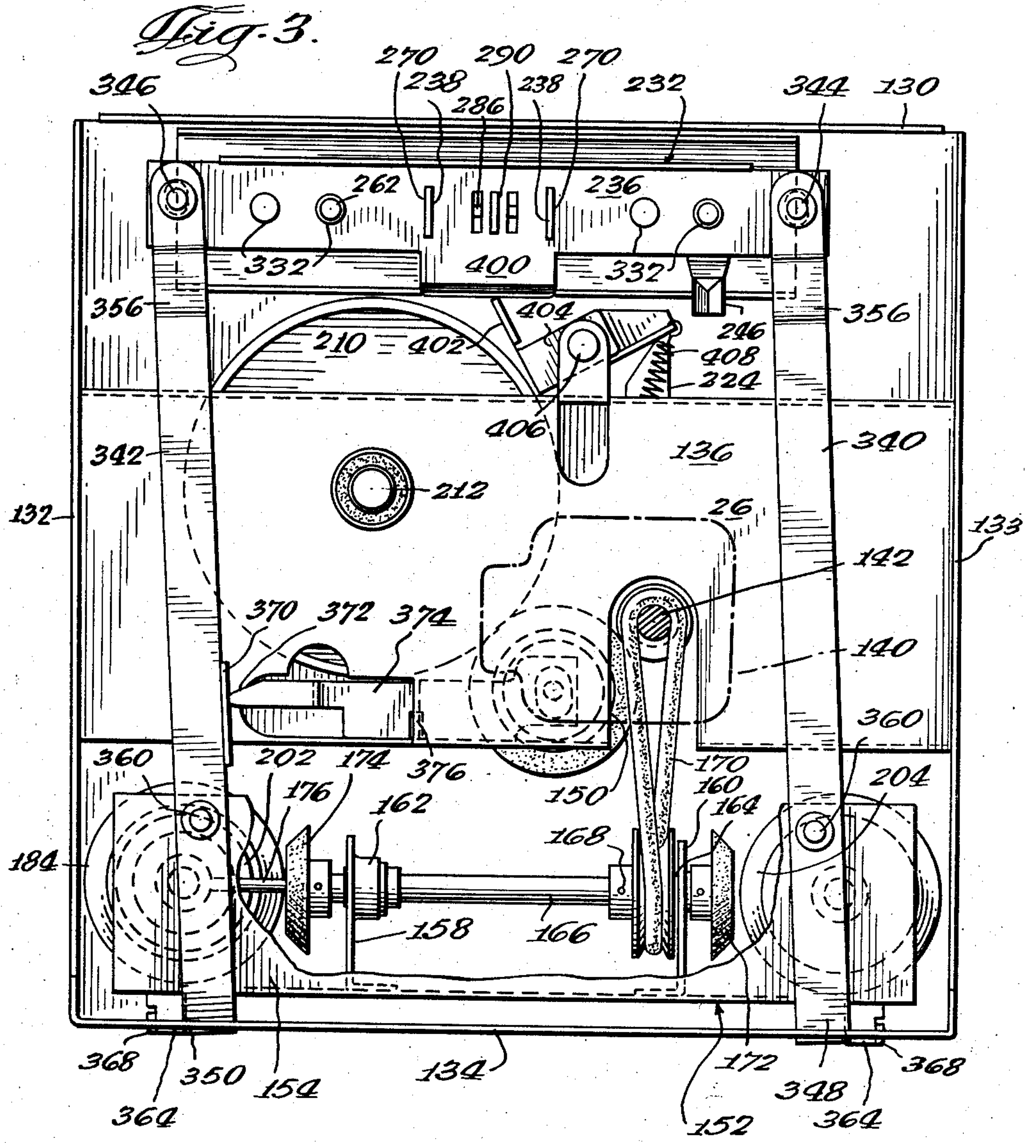
Fig. 3 is a bottom plan view of the operating and control mechanism showing the various parts arranged for fast play back of a tape, portions being broken away to show details.

At the opposite end of the shaft 166, another bevel friction pinion 174 is mounted for rotation with the shaft, and there is a smaller diameter extension 176 of the shaft 166 extending to the left as viewed in Fig. 3 substantially beyond the position of the pinion 174.

The principal driven spindle is the left hand one 32. This spindle is journalled in the top plate 26 at 178 by means of a vertical bushing 180 and has a hub 182 at the bottom of the spindle to which is secured the metal bevel friction wheel 184, the edge of which is adapted to engage the edge of the bevel friction pinion 172 to be driven thereby to rotate the spindle 32. A rubber friction wheel 186 is mounted for rotation with the wheel 184 being connected thereto by means of a drag clutch structure. The clutch structure consists of a metal cup-like washer 188 (see Fig. 14) to which the wheel 186 is secured, the washer being journalled for rotation relative to and axial movement along the hub 182. The washer is continuously urged into engagement with the face 190 of the wheel 184 being separated therefrom by a felt washer 192 to permit slipping if needed, the bias being obtained by a coiled spring 194 held in compressed condition by a washer 196 and nuts 198 engaged over the bottom threaded end 200 of the spindle 32. It will be noted that the rubber friction wheel 186 is cylindrical in formation thereby providing a hollow for the spring 194 on the interior thereof, and having an end which is in a plane perpendicular to the axis of the spindle to present a flat annular friction surface 202 to the shaft extension 176. The fast rotation of the spindle 32 is obviously obtained when the friction wheel 184 is engaged by the pinion 172, the slower speeds, during record and play back being achieved when the shaft extension 176 engages the surface 202 and rotates the spindle 32 through the medium of the clutch. While the device 20 is used for recording or play back, the speed of the tape is controlled by a different connection with the motor, but it is necessary that the spindle rotate at a speed sufficient to take up the tape as it passes the head. To keep the tape wound tightly upon the take up reel 39 the speed of the spindle 32 should be at least a little faster than the speed at which the tape passes the heads, but since the amount of wound-up tape varies, the speed of the spindle 32 must be capable of varying. These functions are permitted because of the clutch mechanism. This structure may be considered a slack take-up mechanism.

On the right hand side of the device 20 the spindle 36 is supported in the same manner as the spindle 32, and hence no detailed description thereof is necessary. There is no rubber friction wheel or clutch mechanism on the right hand spindle, and hence only the wheel 204 is secured to the bottom end of the spindle and same is disposed to be engaged frictionally along a bevelled surface by the bevel friction pinion 172. When the shaft 166 is shifted to the right as viewed in Fig. 3 the engagement is accomplished and the spindle rotates at a high speed in a clockwise direction as viewed in Fig. 1 to rewind the tape on the reel 34.

Since the friction pinions 172 and 174 are only engaged against their respective friction wheels 204 and 184 during wind or rewind as the case may be, they must be out of engagement during record or play back, and must also be disengaged while the control lever 46 is in neutral. This will be described below in the description of the shift mechanism.

Attention is now invited to the pulley member 144. In addition to the friction surface 148 there is a reduced diameter friction surface 206. An idler friction wheel 208 of rubber or the like is arranged to engage either of the surfaces 148 or 206, and thereby to pick up therefrom a rotational speed of two different rates respectively. When engaged against the portion 206 the speed of the idler friction wheel 208 is the least. The friction wheel transmits the rotation of the motor shaft 142 to the flywheel 210 which is secured to a shaft 212 the bottom end of which is journalled at 214 upon the sub-chassis member 36. The upper end of the shaft 212 is journalled at 216 in the top plate 26 and the end protrudes upward forming the drive roller 88. As explained the pressure roller 90 is of rubber and it is mounted on a translatable shaft 92 which moves in slot 94 to engage the tape 38 between itself and the drive roller. Looking at Fig. 7, the pressure roller shaft 92 is journalled at its bottom end at 218 in an L-shaped lever 220 having a large arm 222 and a smaller arm 224. The arm 222 is pivoted to the top plate 26 at 226 and swinging of the lever enables the pressure roller to be moved against the drive roller 88.

It will be seen that when the control lever 46 is in neutral or wind or rewind, it is desired that there be no driving of the tape, and thus at the appropriate position of control of the lever the engagement between pressure and drive rollers must be made. Likewise, the drive roller 88 must be driven at the appropriate speed for the appropriate position of lever 46 or not, as the case may be. All of the linkages for accomplishing the necessary interconnection of the rotational elements of the driving, winding, rewinding, etc. include kinematic chains, and their relationship will be described in the following section.

*Description of shifting mechanism*

The upper plate 26, immediately below the arcuate portion 78 is slotted similar to the irregular opening 62 as indicated by the broken line outline 230. The same control slots are provided, albeit somewhat smaller since the swing of the lever 46 is not as great in this plane. There is no need to apply reference characters to the slots since they serve the same purpose as the slots in the front cover plate 44. The outline in plan is seen in Fig. 1 and sectional views of the control mechanism show several slots in Figs. 6, 10 and 11, the slots in the plate 26 being designated generally 230 in each case.

As previously stated, the movement of the lever 46 lengthwise along the slot 76 moves a carriage below the plate 26. The carriage is designated generally 232 and comprises an upper portion 234 and a lower portion 236, connected by means of a pair of vertical track members 238. The upper portion part of the carriage 232 lies flat against the bottom surface of the plate 26 and is formed of parallel rails 240 and 242 sliding right and left parallel with the front flange 130. The rear rail 242 has a series of notches 244 therein (see Fig. 5) which cooperate with a detent 246 properly to position the carriage 232 relative to the control slots. The upper portion 234 may be formed from an integral strip of metal which has elongate aligned narrower strips cut inwardly from opposite ends and bent at right angles downward. These two bent strips form the track members 238 and it is obvious that the rails 240 and 242 are connected at their centers by a web 248 which has a center slot 250 to permit passage of the shank 112 of the control lever 46. The shaft 116 which passes through the shank as previously described is mounted between the tracks 238 at the upper ends thereof.

Figures 7, 8, 9:
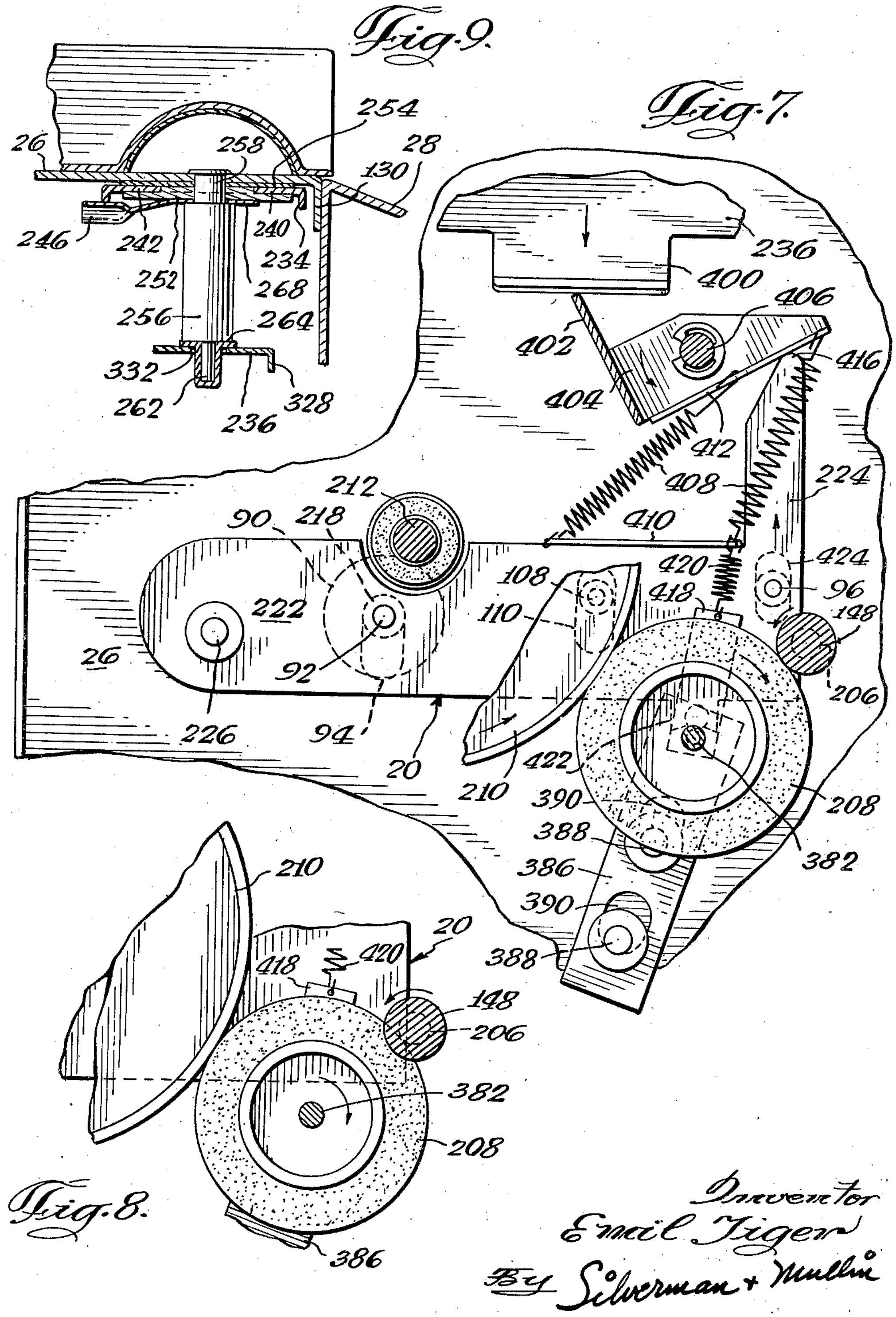
Fig. 7 is a fragmentary bottom plan view of another portion of the mechanism, the control lever having been set in fast play position.
Fig. 8 is a detail of the drive mechanism of Fig. 7.
Fig. 9 is a fragmentary sectional view taken along the line 9—9 of Fig. 5 and in the indicated direction.

At two positions spaced apart there are provided guides 252 (Fig. 9) which consist of strips of metal arranged transverse of the rails 240 and 242 having undercut ends to provide a very stubby T-shaped cross section inverted as viewed in Fig. 9. The rails are confined in and guided by the undercut ends and a friction plate 254 between the rails and the bottom surface of the plate is secured by the same means holding the guides in place. The guides 252 are held in place by posts 256, the upper reduced diameter ends 258 of which pass through and are swaged over upon the top of the plate 26. The bottom ends of the posts are provided with reduced diameter extensions or tips 262 which give rise to shoulders 264, both the extensions and the shoulders being covered with resilient material such as rubber for absorbing shock and preventing noise during use thereof. The detent 246 is formed of a strip of metal 268 secured beneath the right hand post 256, as viewed from the front of the device 20.

The lower portion 236 of the carriage 232 comprises an elongate metal strap arranged parallel with the rails 240 and 242 but capable of riding up and down the track members 238 and for this purpose is provided with suitably positioned slots 270 adjacent the center thereof. The lower portion of the carriage is biased upward by means of two coiled springs 272 each of which has an end connected at the opposite ends of the lower portion 236 at 274 and its second end connected to a perforation 276 in the upper ends of the track members 238 as shown in Figs. 4 and 6. Unless prevented from doing so, the springs tend to pull the lower portion 236 of the carriage 232 upward. When the lever 46 is moved into any of the control slots from neutral, the lower portion 236 will move upward, but when in neutral or stop position, the member 236 is at the bottom of the track members 238. This is accomplished by means of a special linkage associated with the lever 46.

The bifurcated shank 112 of the lever 46 provides two outer leaves to the laminar shank each of which terminates at its bottom end in a circular cam formation 278 which has a notch 280 adapted to be engaged by a pin 282 mounted offset on a link 284, which in turn is pivotally connected at its bottom end with a shaft 286 (Fig. 13) disposed in struck-up loops 288 formed in the bottom portion 236. The slot 290 is for clearance of the bottom end of the link 284. The upper end of the link has a circular head 292 which is slotted in its center at 294. The cam ends 278 of the bifurcated leaves of the shank 112 are riveted together by a pin 296 which passes through the slot 294. Note that the bottom end 298 of the central push rod 125 engages and rides upon the circumferential edge of the head 292.

It will be seen that the notch 280 has a sharp edged side 300 and a smooth edged side 302 (see Fig. 6). Obviously the pin 282 will ride the edge of the cam 278, and from either direction, will fall into the notch 280. But in swinging the lever frontward or rearward, it is necessary to cause the pin 282 to climb out of the notch 280. The sharp edged side 300 is toward the rear of the device 20, and hence, it normally prevents movement of the lever 46 rearward, because the pin 282 engages the undercut portion of the notch edge and will not move. Movement of the pin out of the notch in a forward direction is simple, since the pin follows up the smooth side of the notch and readily moves thereover.

Analyzing this for the moment, in Fig. 13 the lever 46 is illustrated in neutral position. The shank 112 and link 284 are aligned and linked together, with the springs 272 pulling the lower portion 236 upward, but this movement being limited by the engagement of the pin 282 in the notch 280. Under these circumstances there is no mechanical connection from the motor tending to drive the spindles to cause rotation of the reels, and there are no connections for record or play back. The lever 46 can be pulled forward for playback, wind, or rewind, without any further act because of the construction of the notch. But the lever cannot be moved rearward. The pin 282 is engaged in the notch 280 and cannot climb out the sharp edged side.

In order to permit rearward movement of the lever 46 it will therefore be necessary to first push the button 124. Fig. 13 illustrates the condition before the button has been depressed and Fig. 10 illustrates the condition afterward. As stated, the first position is with the pin 282 in the notch 280, and the second position is one in which the central push rod 125 has been translated downward, to the limit of the movements of the shaft 116 in the slot 128 and the pin 296 in the slot 294. Now that this has been done, the pin 282 clears the notch 280 and the control lever can be swung rearward into either of the control slots 64 or 66 for recording at either slow or fast speed. It will be seen that the linked shank 125 and link 284 fold at their pivotal connection on pin 296.

The use of the push button 124 is limited to conditions in which it is desired to record. Since nothing prevents the push rod from being depressed also during wind and rewind as well as when moving the lever 46 into either of the play back positions, the construction must be such that nothing occurs to electrically switch to record when moving the lever 46 forward. The structure accomplishes this by means illustrated in Figs. 6, 10 and 11. A multiple pole switch structure is used in which there are two positions, namely a normal and an actuated. The particular circuit used in a commercially produced version of the invention had two double pole double throw switches, the normal condition being such that the head 98 was connected with the input to the amplifier and the head 100 was deenergized. This situation prevailed during play back as well as wind and re-wind, the difference being that the pressure pads 102 and 104 were moved away from the heads on wind or rewind (as well as stop or neutral) so that the tape would not pass closely to the heads. The idler post 96 was so positioned at these conditions that under tension, the tape 38 passed the heads spaced therefrom. If desired, however, on wind and rewind, it is feasible to have a head disconnect switch operating in conjunction with the linkage to deenergize any connection between the amplifier and the head 98 to eliminate yowling if it occurs. Whether or not head 98 is disconnected or connected to the amplifier input will have no erasing effect on the tape of course.

The multiple pole switch is shown at 310 connected to a support plate 312 at the front of the device. The support plate carries the electronic circuit components of the device 20. A zig-zag leaf spring 314 is secured to the bottom of the support plate at 316 and extends upward in a slot 317 formed in the plate 312. The connections of the switch assembly 310 are not shown, but they are made and broken by a slide rod 318 represented at 320, which is biased upward by some means, such as for example a coiled spring 322 surrounding a portion of the slide rod extending out the bottom of the switch assembly. Normally the slide rod 318 is down as shown in Fig. 10. Since Fig. 10 represents the condition existing when the button 124 has been depressed prior to swinging the lever 46 rearward, a broken line outline of the section view of the lower portion 236 is shown, which represents the position with the button 124 not depressed. The slide rod 318 has a horizontal bend 324 at its upper end which engages beneath a bend or notch 326 in the zig-zag spring 314. The spring 314 is biased to move to the left so that the latching effect upon the horizontal bend 324 is self sustaining. The front edge of the lower portion 236 has a depending flange 328 intended to engage the bend 324 to depress the slide rod 320.

With the bend 324 latched beneath the notch 326, swinging the control lever 46 into any of its forward control notches for play back or winding or rewinding will have no effect upon the slide rod 320. That is because the zig-zag spring 314 is not disturbed in such movements. When swung rearward however, the head 292 of the link 284 moves forward engaging an offset flat 330 of the spring 314, moving the same to the right as viewed in Figs. 10 and 11. This frees the bend 324 from the notch 326 and the slide rod 320 is urged upward to connect the heads 98 and 100 for record.

In returning the lever 46 to neutral position from record position (Fig. 11), as the linkage is straightened, the spring 314 is permitted once more to move to its biased position to the left, as in Fig. 10, and the flange 328 depresses the slide rod 320. The passing of the pin 282 over the sharp edge 300 may be used to depress the bend 324 sufficiently to clear the notch 326 so that the passing of the pin 282 into the notch 280 leaves the bend 324 latched in place, with the flange 328 slightly clearing said bend, having been moved upward by the springs 272.

The description of the carriage 232 and substantially all of its movements has been completed, and the mechanical connections with and linkages actuated by movement of the carriage will now be set forth. One of these concerns the difference between the drive during wind or rewind, and play back. In the former, not only are the spindles driven and the drive roller 88 not driven, but also the pressure pads 102 and 104 and the idler post 96 must be moved backward. The carriage bottom portion 236 is permitted to rise during either play back or record to a limit controlled by the engagement of the shoulders 264 with the portion 236, the tips 262 entering holes 332 (see Figs. 3, 5 and 9) of which there are four, two on either side of center of the lower portion 236. During play or record at one speed, the tips 262 enter the alternate holes, and vice versa. Thus, as seen in Fig. 3, with the lever 46 in fast play back position, the tips 262 are aligned for entry in the right hand hole of each pair. Shifting the control lever 46 to the slow play back or record position, the tips will be poised for entry in the left hand holes.

Permitting the lower portion 236 of the carriage 232 to rise to the limit permitted by the shoulders 264 removes the brake pads from engagement with the friction wheels 184 and 204. This function is needed, however in wind and rewind positions as well as record and play back. It also causes engagement between the extension 176 and the surface 202 of the rubber friction wheel 186 to accomplish slack take-up at a variable rate through the medium of the clutch during record or play back. In wind or rewind this function is not desired, and that is especially true where the tape is to be wound from the reel 30 onto the reel 34, in which case the spindle 32 is rotated in a direction opposite that it is driven by the extension 176.

In order to achieve this discrimination, when the lower portion 236 rises as the lever 46 is pushed into any of the control slots, a linkage system disengages the necessary mechanism as will be described, but the difference between whether the extension 176 will engage the rubber friction wheel 186 is controlled by the height the portion 236 is permitted to rise. When the lever 46 is moved along slot 76 to either end, from whence it may be moved transversely, either into wind or rewind position, the holes 332 no longer align with the axes of the posts 256. Therefore the ends of the tips 262 will engage solid places on the lower portion 236, thereby preventing the same from rising past the tip ends.

*Description of spindle selection and drive connection mechanism*

At opposite ends of the lower portion 236 of the carriage 232 there are secured the ends of two elongate levers 340 and 342 by pivotal connections 344 and 346 respectively. The levers are parallel at all times, each having its opposite end engaged in a slot formed in the rear wall 134. Thus the lever 340 has its end 348 engaged in such a slot, and the lever 342 has its end 350 engaged in such a slot, designated 352 and best seen in Figs. 4 and 16. The slots are of such dimension as to quite closely confine the ends of the parallel levers 340 and 342. They thus serve as unusual pivotal connections. As the carriage is moved from side to side while the lever 46 is translated along the slot 76, the slots 352 permit substantially pure pivotal movement, the levers 340 and 342 pivoting around their back ends in substantially the same plane. As the carriage is raised or lowered, the levers 340 and 342 are required to pivot up and down at the slots 352, and because of the free slotted connection, this is feasible. In addition, since there is considerable apparatus which must be cleared, the levers each have a downwardly offset bend as shown in Figs. 3 and 4 at 356 and 358 so that the slots 352 are positioned considerably below the uppermost position of the lower portion 236 when recording or playing back. Thus, not only must there be pivotal action between lever ends 348 and 350 and their slots 352, but the lever ends are required to slide in and out of their slots. The complete freedom between lever ends and slots permits this.

The rear ends of the levers 340 and 342 support the shiftable carriage 152. Thus, the carrier plate 154 is pivotally connected at 360 and 362 and hence it slides in a direction parallel with the carriage 232 each time the lever 46 is shifted along the length of the neutral slot. The upstanding rear wall 156 has integral ears 364 confined in elongate slots 366 formed in the wall 134 capable of both pivotal and sliding motion, but having bent over corners 368 to prevent in and out sliding movement. It has been explained how the carriage 152 in being shifted from side to side connects the motor to drive the spindles in different manners and at different speeds. The actual shifting is of course accomplished by movement of the lever 46.

It has also been explained that the extension 176 is to be moved into connection with the rubber friction wheel 186 during record or play back but not otherwise. As previously described, the upward movement of the carriage 232 is maximum when the lever 46 is shifted to one of the record or play back control slots. This will best be seen by making a comparison between Figs. 4 and 12. In neutral position, the levers 340 and 342 have their right hand ends (Fig. 4) at the lowest extent of the movement of the portion 236 along the track members 238. The shiftable carriage 152 is positioned as shown, with the extension not engaging the friction wheel 186. In Fig. 12, however, the portion 236 has been raised to its fullest extent, and the levers 340 and 342 have their front ends pulled up. The shiftable carriage 152 is tilted back around the pivotal connection of the ears 364 and the wall 134, thereby raising the extension 176 into connection with the rubber friction wheel 186 for taking up slack while recording or playing back. Obviously, during wind and rewind, the shiftable carriage 152 is not tilted back quite so far and hence the extension 176 does not engage the end surface 202, and the spindles are free to rotate or be rotated without interference from the extension 176. Note that the extension is long enough so that it can engage the rubber friction wheel 186 in both positions of the lever at different speeds of record or play back. Although not shown, springs connect between the shiftable carriage 152 and the sub-chassis member 136 to assist in the upward translative movement of the portion 236 and the upward pivotal movement of the shiftable carriage, to establish good frictional engagements.

The shifting of the shiftable carriage to achieve various functional connections is believed obvious without the need for further discussion and hence the means for achieving different speeds will be described.

The lever 342 (see Fig. 15) has a small flat bearing plate 370 adapted to be engaged by the end 372 of a rocker arm 374 which has a slightly pivotal, slotted rocking connection at 376 with a lug 378 formed from the sub-chassis member 136. The opposite end 380 of the rocker arm 374 is engaged with the bottom end of a shaft 382 which carries the idler friction wheel 208. This engagement may include a forked end, or a saddle, or any kind of pivotal connection restraining downward movement of the shaft 382, and perhaps some friction reducing members. The wheel 208 is biased downward on the shaft by the spring 384. The shaft 382 is mounted at 385 upon a strap 386 by means of a rivet end. The strap 386 is secured to upper plate 26 by means of a pair of pins 388 engaging slots 390 to provide for shifting of the strap 386 and hence translative movement of the shaft. This is needed to cause engagement and disengagement between the motor drive 206 or 148 and flywheel 210 and the friction idler 208. The mechanism for accomplishing this will be described.

Figures 14, 15, 16:
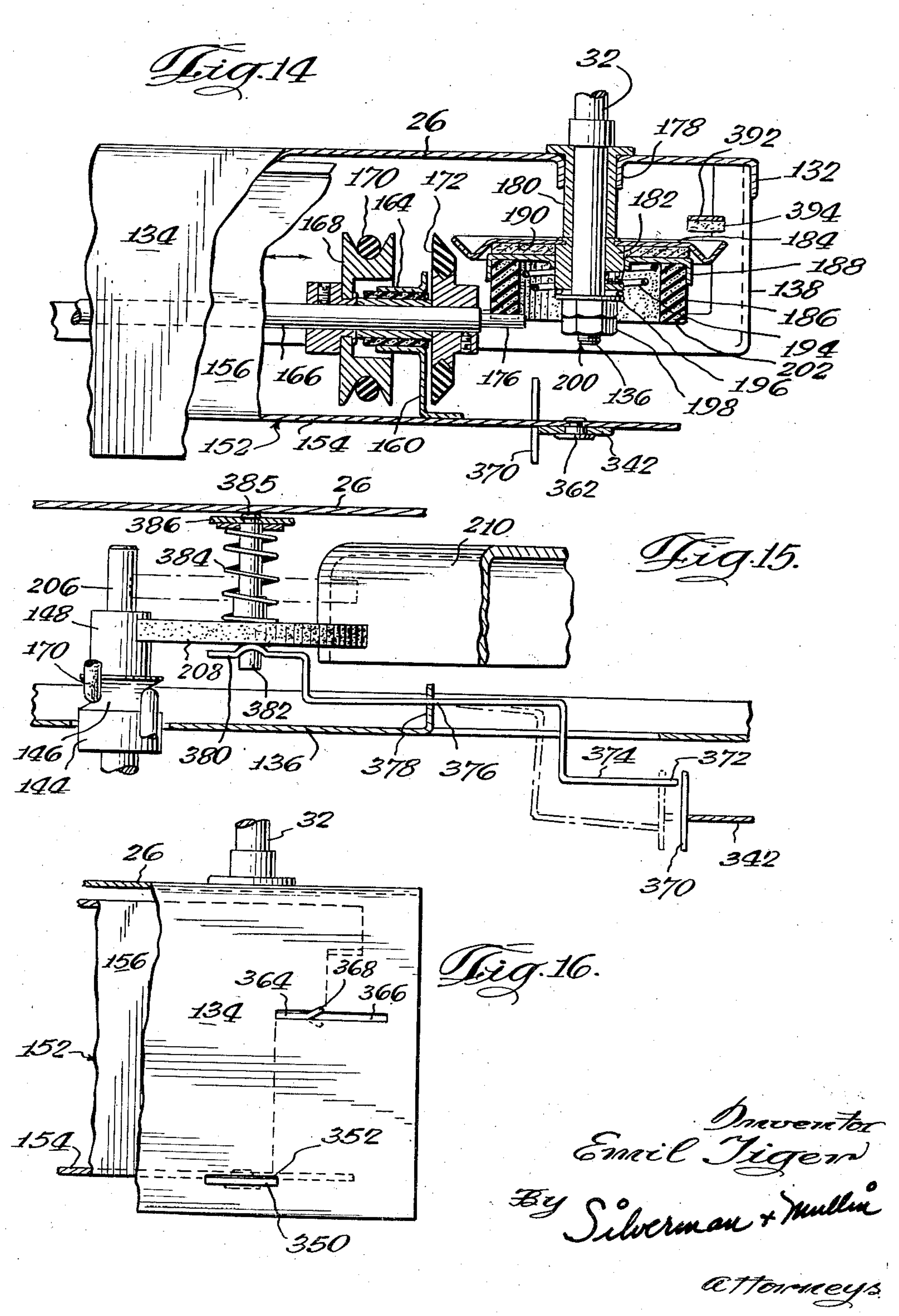
Fig. 14 is a sectional view taken through the mechanism along the line 14—14 of Fig. 4 and looking from the rear to the front of the device.
Fig. 15 is a fragmentary sectional view taken through the drive mechanism.
Fig. 16 is a fragmentary rear elevational view of a portion of the mechanism taken along the plane 16—16 of Fig. 12 and looking at the rear of the chassis.

The wheel 208 is capable of up and down movement on its shaft 382 and hence rocking of the rocker arm 374 caused by shifting of the lever 46 and consequent movement of the lever 342 will raise or lower the end 380 of the rocker arm, and hence shift the idler to be poised opposite the surfaces 148 or 206. In Fig. 15 the second position of rocker arm 374 and wheel 208 is shown in broken lines. Movement of the control lever 46 into one of the control slots for recording or play back will cause engagement of the idler wheel with the drive wheel and flywheel, in a manner to be described.

Attention is now invited to the braking mechanism. Braking must be accomplished every time the lever 46 is moved into neutral position. At opposite ends of the shiftable carriage 152 at the top corners of the rear wall 156 there are provided forwardly extending arms 392, the ends of which are provided with braking pads 394 poised over the top surfaces of the wheels 184 and 204 and in engagement therewith when the lever 46 is in neutral position. Pressure is controlled by a set-screw threaded in a lug 398 bent from rear wall 156. As seen from Fig. 12, even the slightest tilting of the shiftable carriage 152 raises the braking pads 394, and this of course occurs every time the control lever 46 is moved into one of the control slots.

*Description of tape drive mechanism*

The lower portion 236 of the carriage 232 has a rearwardly extending tongue 400 which is narrow, compared to the length of the portion 236, and which, when the lever is moved to record or play back positions, will engage with a cam 402 mounted on a member 404 pivoted to the plate 26 at 406. The L-shaped lever 220 previously referred to has springs 408 connected between flange 410 and flange 412 of the member 404 which tend to rotate the member 404 in a clockwise direction (Fig. 7) while slightly rotating the L-shaped lever 220 in a similar direction about the pivot 226. This is caused by the engagement of the flange 412 with the end 416 of the arm 224. A short strap 418 has one end connected to the shaft 382 of the idler wheel 208 and has its other end connected by spring 420 to the flange 410. The spring 420 tends to pull the idler wheel 208 against the flywheel 210 and drive 206 or 148, depending upon the vertical position of the idler wheel. This is prevented by a notched projection 422 formed integral with the arm 222 along an edge thereof. Obviously when the tongue 400 has not engaged the cam 402, the lever 220 will push the shaft 382 to a position away from the flywheel and drive portions 206 and 148, the slots 390 limiting the position of the shaft 382.

When the tongue 400 engages the cam 402 and rotates member 404, as when the device 20 is set into operation for record or play back the parts assume the positions shown in Fig. 7 and the drive roller 88 is rotated.

The L-shaped lever 220 carries the shaft 92 of the pressure roller, the vertical rod 108 of the pressure pads, and the guide post 96 so that when the lever is moved, all of the elements described move toward the front of the device in their respective slots 94, 110 and 424. The tape is aligned perfectly parallel with the heads 98 and 100 and the pressure pads cause engagement with the surfaces of the heads, and the drive roller 88 drives the tape forward.

*Summary and conclusion*

In the above description of the invention an attempt was made to set forth the operation of the various elements of the structure in a somewhat running account paralleling the descriptive matter. Because of this, an involved description of operation is not believed necessary. The general operation, however will be summarized for the various positions of the control lever 46 in order that the advantages of the invention may be fully appreciated.

Although the opening statement of this specification stated that the specific purpose of the mechanism was to control the various speeds at which the device 20 operates, by now it should be appreciated that there are a plurality of functions which must be accomplished for any given setting of the control lever 46 in order to eliminate the control means of the prior art apparatus which the invention improves upon. The functions will be summarized for the various positions of the lever hereinafter.

Presume first that the device 20 has been energized electrically and the motor 140 is rotating, thereby causing continuous rotation of the shaft 142, the pulley member 144, and the shaft 166 with bevel friction pinions 172 and 174.

1. In neutral position, with the lever 46 in the slot 76, the following conditions prevail:

*a.* Brake pads 394 are in engagement with the wheels 184 and 204 and thus the spindles 32 and 36 are not rotating.

*b.* The pressure roller 90 is away from the drive roller 88; the idler post 96 is at the upper end of its slot 424 (as in Fig. 2); and the pressure pads 102 and 104 are off the heads 98 and 100.

*c.* The wheel 208 is not in contact with either the flywheel 210 or any part of the pulley member 144, the L-shaped lever 220 acting to push the strap 386 in a direction pulling the shaft 382 against the tension of the spring 420.

*d.* The lower portion 236 of the carriage 232 is at its lowest position, with the carriage disposed along its path wherever the lever 46 resting in its slot 176 has slid the same.

*e.* The shiftable carriage 154 is also at a position to which it may have been slid, but is erect, and neither of the bevel friction pinions 172 or 174 engages its cooperative friction wheel 184 or 204, although by virtue of the shifting a bevel pinion may be poised immediately adjacent a wheel to be engaged thereagainst as soon as the lever 46 is thrown into either of the control slots 68 or 74 for wind or rewind condition. The extension 176 is not engaged against the rubber friction wheel 186.

*f.* The slide rod 320 is down (Fig. 10) with the bend 324 engaged in notch 326 energizing the device 20 electrically as though the same were to play back.

2. Moving the control lever into either one of the slots 68 or 74, to wind or rewind, the following conditions will prevail:

*a.* The conditions described in 1(*b*), 1(*c*), and above remain the same.

*b.* The shiftable carriage 154 is tilted back, thereby raising the brake pads 394 and freeing the wheels 184 and 204 for rotation.

*c.* The carriage bottom portion 236 has been raised, but not to its fullest extent and rests on the tips 262 pivoting the levers 340 and 342 upward, and only one of the bevel friction pinions engages its friction wheel, and rotates the same at a high speed. The directions of the rotation of the friction wheels 184 and 204 are opposite one another.

*d.* In the event that the lever 46 is in slot 68 the wheel 208 is positioned as shown in Fig. 4 on the same level as the larger diameter portion 148 of the pulley member 144, but in the event the lever 46 is in slot 74 the wheel 208 has been raised to a position on a level with the smaller diameter portion 206. It does not engage the pulley member 144 or the flywheel 210 in either position, nor is its position pertinent insofar as wind or rewind is concerned, but the positioning is desired to set up the mechanism for use in record or play back. The proportions of parts and their arrangement is such that the wheel 208 is alongside the larger diameter portion 148 when the lever 46 is anywhere on the left hand part of the irregular opening 62 and is alongside the smaller diameter portion when the lever 46 is anywhere in the right hand part of the opening 62. This is achieved by cooperation of the lever 342, bearing plate 370, end 372, rocker arm 374, etc.

3. Moving the control lever 46 into the control slot 70 to get fast play back, the following conditions will prevail:

*a.* The conditions described in 1(*f*), and 2(*b*) are the same.

*b.* The carriage bottom portion 236 has been raised to its fullest extent carrying with it the ends of the levers 340 and 342, and bringing the extension 176 into engagement with the friction surface 202 to provide slack take-up, rotating spindle 32.

*c.* The bevel friction pinions 172 and 174 are between their friction wheels and hence rotate freely.

*d.* The wheel 208 has been moved into engagement with the flywheel 210 and the pulley member 144, in this case engaging the large diameter portion 148, thereby causing the motor to rotate the drive roller 88.

*e.* The pressure roller, 90, pressure pads 102 and 104 and the idler post 96 has moved forward of the device 20, to guide and confine the tape 38 as it moves past and in engagement with both heads 98 and 100.

4. Moving the control lever 46 into the control slot 64 to obtain fast record, the following conditions prevail.

*a.* The button 124 has been depressed to permit this movement.

*b.* The conditions described in 2(*b*), 3(*b*), 3(*c*), 3(*d*) and 3(*e*) are the same.

*c.* The leaf spring 314 has been pushed back, and the slide rod 320 has caused circuit switching in switches 310 to the electrical conditions of record (Fig. 11).

5. Slow playback, achieved by moving the lever 46 into the control slot 72 is exactly the same as 3 above, except, as pointed out in 2(*d*) the wheel 208 is in raised position alongside the smaller diameter portion of the pulley member 144, having been raised when the lever 46 was translated along the slot 76 to the position prior to entering the slot 72 (or 66).

6. Slow record, achieved by moving the lever 46 into the control slot 66 is the same as 4 above, except for the position of the wheel 208, as described. The speed of the drive roller 83 is therefore slower.

Certain structure and apparatus not pertinent for the understanding of the invention has neither been described nor shown. For example, the device 20 is ordinarily provided with guides on opposite sides of the heads to maintain the proper alignment of tape with the faces of the heads. Likewise fastening means, set screws, keys, rivets, and the like are not detailed since their structure is obvious and well known.

It is once more desired to point out that the invention is directed to providing a simple and foolproof recording device, which, although described as a tape recorder, is perfectly adaptable for wire, without varying from the scope thereof. Great variation is possible in the structure without departing in any material extent from the coverage of the claims appended hereto.

What it is desired to secure by Letters Patent of the United States is:

1. In a recording device which is adapted to record upon or play back from an elongate flexible magnetic member, and having a take-up reel and spindle, a feed reel and spindle, electromagnetic means for influencing the magnetic member to record or play back, means for leading the flexible magnetic member from one reel to the other and past the electromagnetic means, electronic means energizing the electromagnetic means, an electric motor, and means connecting the electric motor for driving or preventing movement of the flexible member, take up spindle, feed spindle, and controlling operation of the device, comprising: a multiple position selectively movable control lever, positioning guide means for said lever, a shiftable carriage having a shaft thereon continuously connected with and rotated by said motor, first and second friction wheels at opposite ends of the shaft, the take up spindle having a third friction wheel, the feed spindle having a fourth friction wheel, slack take-up means connected with the take-up spindle, flexible member drive means, some of the positions of the control lever being record, play back, wind, rewind, and neutral, said connecting means including a coupling for connecting the flexible member drive means with the motor to translate the magnetic member at a uniform rate past the electromagnetic means, said leading means including pressure means for pressing the flexible magnetic member against the electromagnetic means, there being mechanical connections between the lever and the various mentioned means such that when moved to wind or rewind position, the shiftable carriage is moved to cause engagement between the first and third or second and fourth friction wheels, with the drive, pressure, and slack take-up means inoperative, and when moved to record or play back position, the slack take-up and coupling are connected with the motor to be driven thereby, the pressure means are operated, and none of the friction wheels engage one another.

2. A structure as claimed in claim 1 in which there are braking means for preventing the rotation of the take-up and feed spindles when the lever is in neutral position, and said braking means are connected with said lever and movable to non-braking positions when said lever is moved to any of said other positions.

3. A structure as claimed in claim 1 in which there are switch means movable between two positions, one position being recording, and the second position being for play back, and means for energizing said electromagnetic means through said switch means, said lever having a connection with said switch means, the normal position of said switch means being the second of said positions, the connection being operative to move the switch to said first position only when said lever is moved to record position, and being inoperative at all other times.

4. A structure as claimed in claim 1 in which the slack take-up means comprises a clutch having a fifth friction wheel for rotating said clutch with the clutch between the spindle and the fifth friction wheel, said shaft having a rotating member adapted to engage the friction wheel to drive the clutch at a speed greater than sufficient to take up the flexible member while same is being driven at said uniform rate, one of said mechanical connections between the lever and shiftable carriage being operable only during record or play back to cause engagement between said rotating member and fifth friction wheel.

5. A structure as described in claim 4 in which the fifth friction wheel is annular in configuration and the rotating member comprises an extension of said shaft engaging a flat end of said fifth friction wheel to drive the same on an axis at right angles to that of said shaft.

6. A structure as claimed in claim 3 in which said lever has a latch normally engaged preventing the said lever from being moved to record position, and a push-button on the end of the lever to render the latch inoperative, so that the push-button can be depressed and lever moved simultaneously to record position.

7. A structure as described in claim 1 in which said positioning guide means comprises an elongate slot having branches extending out of the sides of the slot at substantially right angles thereto, and the neutral position of said lever is any place along said slot, while the various other positions are positions of the lever when moved into the various branches.

8. A structure as described in claim 7 in which there is a second shiftable carriage arranged to be translated parallel to said elongate slot and connected with said lever and having a lower portion biased to move upward toward an upper portion with the lever having an upper and a lower link pivotally connected together and respectively connected to the upper and lower portions of the second shiftable carriage, the movement of the lever into one of the branches causing the folding of the links at their connecting pivot point and the consequent raising of the lower portion of the second shiftable carriage, and means connecting the shiftable carriages to move together when the second carriage is translated, and to rock the first carriage when the lower portion of the second carriage is raised, said movement and rocking serving to establish driving connections between said motor and the spindles.

9. A structure as described in claim 1 in which the positioning guide means comprises an elongate slot having front and rear extending transverse branches, there being at least three front extending branches with one at each end of the slot corresponding to wind and rewind positions, the third front extending branch being adjacent the center of the elongate slot and corresponding to play back position, and there being at least one rear extending branch adjacent the center of the slot corresponding to record position, lever means having one end pivoted to a stationary wall portion of said device rearward of the shiftable carriage and having the opposite end pivoted to said lever and the carriage pivotally secured between the ends thereof and means guiding the shiftable carriage along a path parallel with the elongate slot and movement of said lever along said slot, the pivotal connection between shiftable carriage and lever means being such as to prevent relative vertical movement between the lever means and shiftable carriage, but the pivotal connection of the lever means with the stationary wall portion being slidable to permit vertical rocking of the lever means if same are raised and lowered at the control lever end, and means for raising the control lever end of the lever means when the control lever is moved into any of said branches to cause engagement of friction wheels for driving a spindle in the case of the end branches, and to cause engagement of the motor with the drive means and operation of the take-up means in the case of the central branches.

10. A structure as claimed in claim 9 in which said electric motor has a rotating pulley member, and said flexible member drive means comprises a drive roller arranged with the flexible member passing alongside the same in engagement therewith and mounted on a drive shaft with an inertia wheel, an idler shaft having an idler wheel thereon, the axes of said pulley member, drive shaft and idler shaft being parallel but the idler shaft being translatable to carry the idler wheel either into or out of engagement with the inertia wheel and pulley member, and means for translating said idler shaft from a position normally not in engagement to a position in engagement with the control lever is moved into record or play back position.

11. A structure as claimed in claim 9 in which said electric motor has a rotating pulley member, and said flexible member drive means comprises a drive roller arranged with the flexible member passing alongside the same in engagement therewith and mounted on a drive shaft with an inertia wheel, an idler shaft having an idler wheel thereon, the axes of said pulley member, drive shaft and idler shaft being parallel but the idler shaft being translatable to carry the idler wheel either into or out of engagement with the inertia wheel and pulley member, and means for translating said idler shaft from a position normally not in engagement to a position in engagement when the control lever is moved into record or play back position, said last mentioned means being connected to said pressure means and including a pressure idler wheel movable into engagement with the drive roller to sandwich the flexible member therebetween and frictionally move the same.

12. A structure as claimed in claim 9 in which said electric motor has a rotating pulley member, and said flexible member drive means comprises a drive roller arranged with the flexible member passing alongside the same in engagement therewith and mounted on a drive shaft with an inertia wheel, an idler shaft having an idler wheel thereon, the axes of said pulley member, drive shaft and idler shaft being parallel but the idler shaft being translatable to carry the idler wheel either into or out of engagement with the the inertia wheel and pulley member, and means for translating said idler shaft from a position normally not in engagement to a position in engagement when the control lever is moved into record or play back position, the amount of movement of the lever into the wind and rewind position branches being less than the amount in the other branches, whereby the shiftable carriage is raised less on wind and rewind, the shaft having the first and second friction wheels having an extension, and the slack take-up means having a friction wheel adapted to engage said extension but only if the shiftable carriage is raised upon movement of the control lever into play or record position.

13. In a recording device of the character described in which the recording medium consists of a magnetizable flexible member and in which there are take up and feed spindles mounting reels for said flexible member, magnetic heads adapted to have the flexible member pass contiguous thereto to record or play back, an electronic circuit connected to energize or deenergize the heads as desired, a drive roller, a pressure roller movable to engage the drive roller with the flexible member therebetween, an electric motor for rotating the spindles and drive roller, means for controlling the operation of the device, comprising: an elongate vertically arranged control lever having upper and lower links and having a center knuckle joining the links, the upper link adapted to be rocked one side or the other of vertical about the knuckle and thereby cause the links to fold and raise the lower link, a pulley member coupled for rotation with the motor, a driven wheel mounted for rotation with the drive roller and having an axis parallel with and spaced from the axis of the pulley member, a shaft also parallel with the pulley member and having an idler wheel mounted thereon, the shaft being movable to carry the idler wheel into engagement with the driven wheel and the pulley member to transfer rotation of the motor to the drive roller, mechanical connection between the lower link of the control lever and the shaft whereby when the lower link is raised the shaft will move the idler wheel into engaged position, and means simultaneously moving the pressure roller against the drive roller.

14. A structure as claimed in claim 13 in which there is an irregular opening having a plurality of recesses for having the lever rocked thereinto for record, play back, wind or rewind, said lower link having an elongate member arranged at right angles thereto and adapted to rise with the bottom link, a central protruding tongue on said elongate member, and the mechanical connection to move said shaft including a cam adapted to be engaged by the said tongue, said irregular opening being elongate and having recesses at opposite ends for wind and rewind, said lever adapted to be moved to one or the other of said recesses for wind or rewind, and such movement carrying the said tongue out of the path of said cam, whereby when said lower link is raised in rocking the lever into one or the other of said wind or rewind recesses, the tongue will not engage the cam and the drive roller will not rotate, there being a shaft having pinions at opposite ends thereof, a linkage between said control lever and last mentioned shaft, pinions on the spindles, and the distance between the first mentioned pinions being less than the distance between the second mentioned pinions whereby when the control lever is other than at one end or the other of its irregular opening, the pinions are not engaged, but when at one end or the other the last mentioned shaft will be shifted axially to cause juxtaposition of one of the first pinions and one of the second pinions, and when the lever is rocked into the wind or rewind recess the pinions will frictionally engage and cause rotation of the connecting spindle, leaving the other free to rotate.

15. A structure as described in claim 14 in which there is a take-up device connected with the take-up spindle and driven by the motor, but only when the lever is moved to record or play back position.

16. A structure as described in claim 13 in which the recording device is intended to record or play back at two different speeds, there being an elongate slot in which the control lever is adapted to be moved laterally of the direction of rocking, and there being a pair of oppositely directed aligned slots transverse of the elongate slot for one speed of record and play back, respectively, and a second similar pair for a second speed spaced along the elongate slot, the pulley member having a large diameter and a small diameter part, a rocker arm engaging the idler wheel and adapted to move the same axially of its shaft to be disposed opposite the large or small diameter part of the pulley wheel, and means between the lower link and the rocker arm to rock the rocker arm when the lever is moved along the elongate slot from one pair of slots to the other.

17. A structure as claimed in claim 14 in which switch means are provided for connecting the electronic circuit to the heads for record condition, said switch being actuated only when said lever is rocked to record position, and said switch being otherwise connected to said heads for play back condition.

18. Control means for a recording device, said recording device having a take-up spindle mounted on the chassis with a take-up reel for said flexible member on the exterior of the chassis and a friction wheel on said spindle on the interior of the chassis, a feed spindle on the chassis having its axis parallel with and spaced from the take-up spindle and having a feed reel on one end disposed on the exterior of the chassis and a second friction wheel on the other end of the feed spindle disposed on the interior of the chassis, magnetic head means for recording upon or playing back from the flexible member and having means associated therewith for bringing the flexible member in proximity thereto, means for driving the flexible member during record or play back and adapted to release the same at all other times, an electronic circuit and means for switching the circuit to connect with the head means in record or play back condition, said control means comprising: a control lever normally arranged vertically in neutral position, the lower end being on the interior of the chassis and the upper end extending out of the chassis through an irregular opening in said chassis, said irregular opening consisting of an elongate part parallel with the plane defined by the axes of said spindles, and the elongate part having short transverse slots, one at each end and directed in the same direction, representing wind and rewind positions respectively, and at least two short slots in the center but extending on opposite sides of the elongate part in opposite directions and representing record and play back positions, a first carriage connected with the lower end of the control lever disposed on the inside of the chassis and having a lower plate slidable parallel with the elongate part of the slot as the control lever is slid therealong, the said lower part adapted to rise as the control lever is rocked into any one of said short slots but said carriage having means causing the amount of rise of said lower part to be less on wind and rewind than it is on record and play back, a pair of parallel elongate levers having one end of each pivotally mounted to said lower plate at spaced points, said chassis having a vertical wall rearward of the plane of the axes of the spindles relative the irregular opening, a pair of spaced aligned horizontal slots, the second end of each of the elongate levers being flat and engaged in said slots respectively whereby sliding movement of said lower plate of the first carriage will cause pivotal movement of the elongate levers in the same plane, and vertical movement of the lower plate of the first carriage will cause vertical pivoting of the elongate levers in their respective slots, a second carriage mounted on said elongate levers below said spindles and having a slotted connection with said vertical wall to be guided in sliding movement substantially parallel therewith when the control lever is moved along said elongate part of said irregular opening, and said second carriage being rockable vertically about the slotted connection to approach or recede from said friction wheels of said spindles when said control lever is rocked into a transverse slot, a shaft mounted on the second carriage and having continuous rotating connection with said motor to be driven thereby, means on the second carriage shaft for coupling the same to one or the other of said friction wheels but only when said elongate levers and second carriage are slid to one end or the other of their extent of movement by the control lever and also rocked upward by rocking of the control lever into wind or rewind position.

19. A structure as claimed in claim 18 in which the driving means includes a drive roller and a pressure roller, the rollers being disposed on the exterior of the chassis and the drive roller being mounted on a vertical shaft disposed on the interior of the chassis and having a driven member on said vertical shaft, a movable idler adapted to be connected between said motor and driven member to cause rotation of the drive roller, an extension on the said lower plate and cam means connected with said idler, the extension being aligned to engage the cam means only when said first carriage is slid to a position obtained by moving said control lever along said elongate part to the center slots, and engaging said cam to couple the motor and drive roller when the control lever is rocked into one of said center slots, and means connecting the cam means with the pressure roller simultaneously to cause engagement between the pressure roller and drive roller.

20. A structure as claimed in claim 19 in which the take-up spindle has take-up clutch means for driving the spindle during record or play back, revolvable means on said second carriage shaft disposed to be rocked into engagement with the take-up clutch means when said control lever is moved into either record or play back position, but otherwise disconnected.

21. A structure as claimed in claim 18 in which the lower plate is arranged to move vertically only and the control lever has upper and lower links pivoted together on the interior of the chassis so that the links fold during rocking of the lever but not during sliding movement thereof and in folding raise said lower plate.

22. A structure as described in claim 21 in which said switch means include a mechanical arm, the folding of said links serving to operate said arm but only when said lever is rocked to record position, and said link having manually unlockable lock means preventing rocking to record position.

23. A structure as described in claim 19 in which the recording device is intended for use at two speeds of record and play back and there are four of said short center transverse slots, two for record and play back at one speed, and two for record and play back at another speed, the slots for any one speed being substantially aligned, a rocking arm having shift means with one arm arranged in the path of movement of said elongate levers as the control lever is slid along said elongate part of the irregular opening, the shift means being connected with said idler wheel for moving the same axially, a pair of rotating parts connected to rotate with the motor at different circumferential speeds and shifting of said idler wheel by said rocking arm serving to align said idler wheel with one or the other of said rotating parts so that when said idler is moved into connection with said driven member it will also engage one or the other of said motor driven rotating parts to drive said drive roller at one or the other of said two speeds.

No references cited.